June 13, 1944. M. KOULISH 2,351,134
MACHINE FOR GRINDING "V" JEWELS
Filed Jan. 8, 1943 3 Sheets-Sheet 1

INVENTOR.
Meyer Koulish
BY Furman Rinehart
ATTORNEY

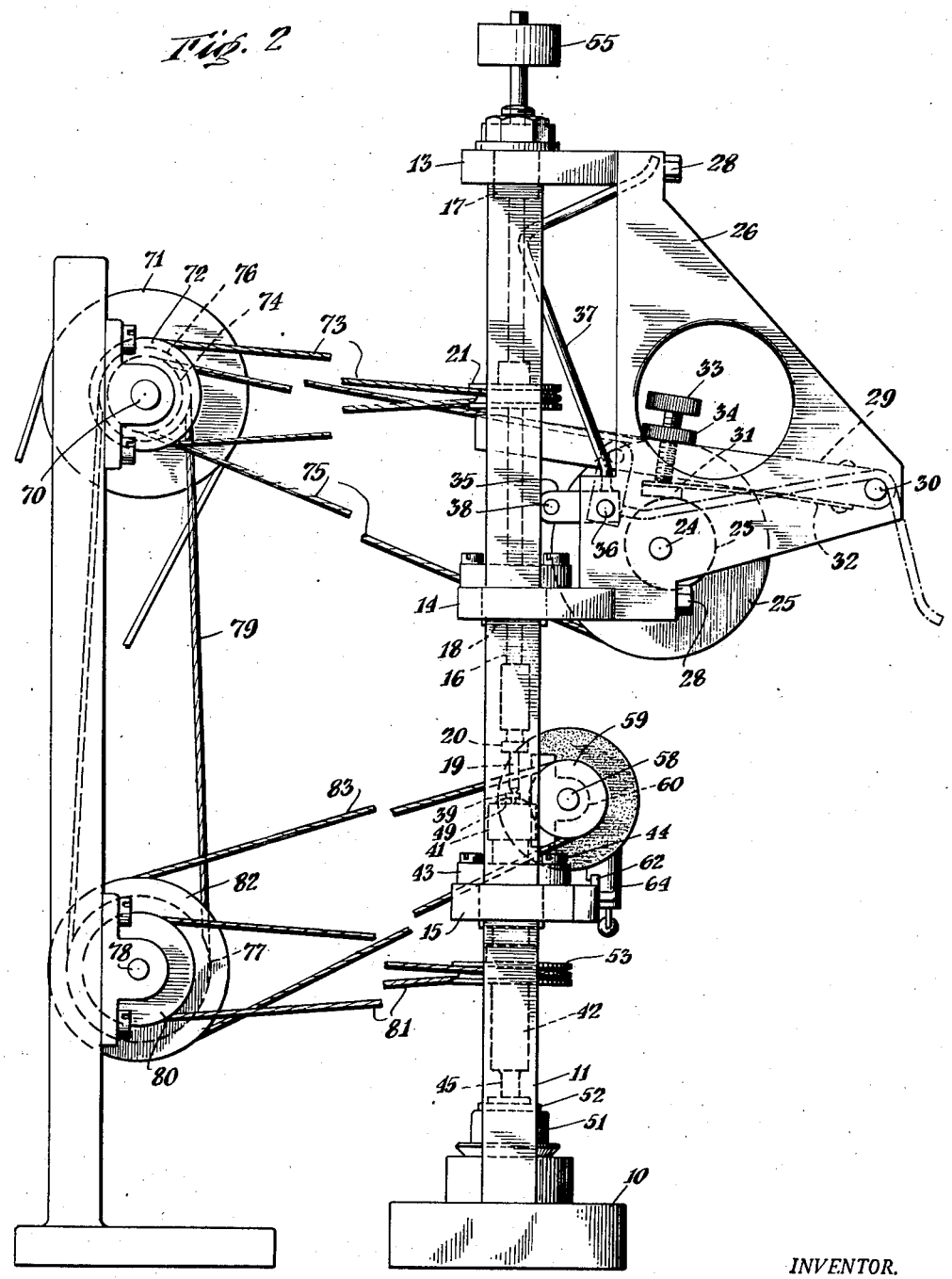

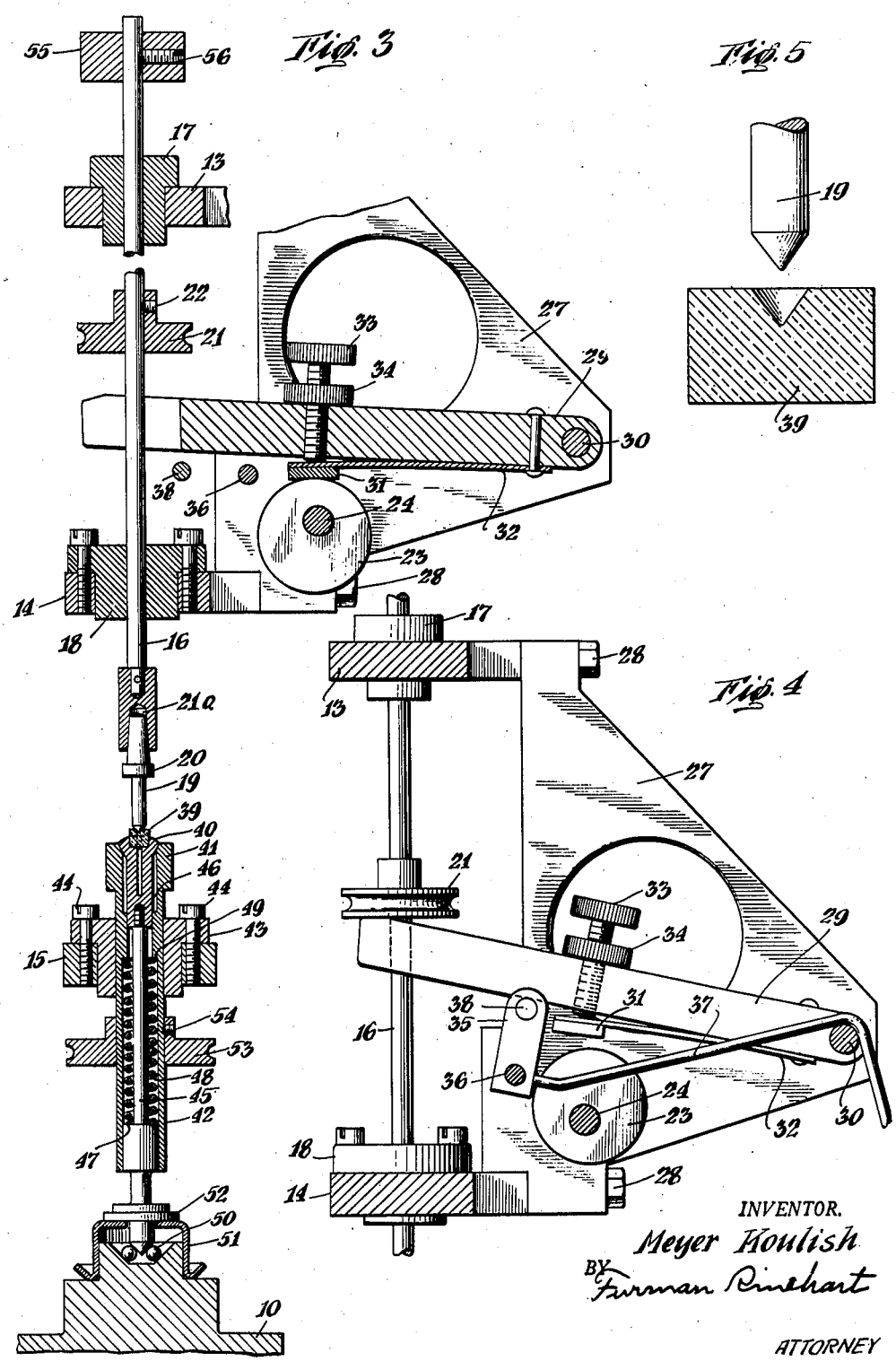

Patented June 13, 1944

2,351,134

UNITED STATES PATENT OFFICE 2,351,134

MACHINE FOR GRINDING "V" JEWELS

Meyer Koulish, New York, N. Y., assignor to Meyer Koulish Co., Inc., New York, N. Y., a corporation of New York Application January 8, 1943, Serial No. 471,667

6 Claims. (Cl. 125—30)

The invention relates to the art of grinding jewels and provides more particularly a machine for mechanically and automatically grinding V-shaped cavities in jewels of the type used as bearings in delicate precision instruments.

The objects and advantages of this invention will appear from the detailed description which follows accompanied by drawings showing for purely illustrative purposes a preferred embodiment of the invention. It is to be understood, however, that the description is not to be taken in a limiting sense, the scope of the invention being defined in the appended claims.

In the drawings:

Fig. 2 is a side view of the machine shown in Fig. 1;

Fig. 3 is a detailed elevational view of elements shown in Fig. 1, a section being taken on line 3—3 of Fig. 1;

Fig. 4 is a detailed view of elements shown in Figs. 1 and 2, and

Fig. 5 is an enlarged sectional view of a V jewel and a tool therefor.

Figure 1:
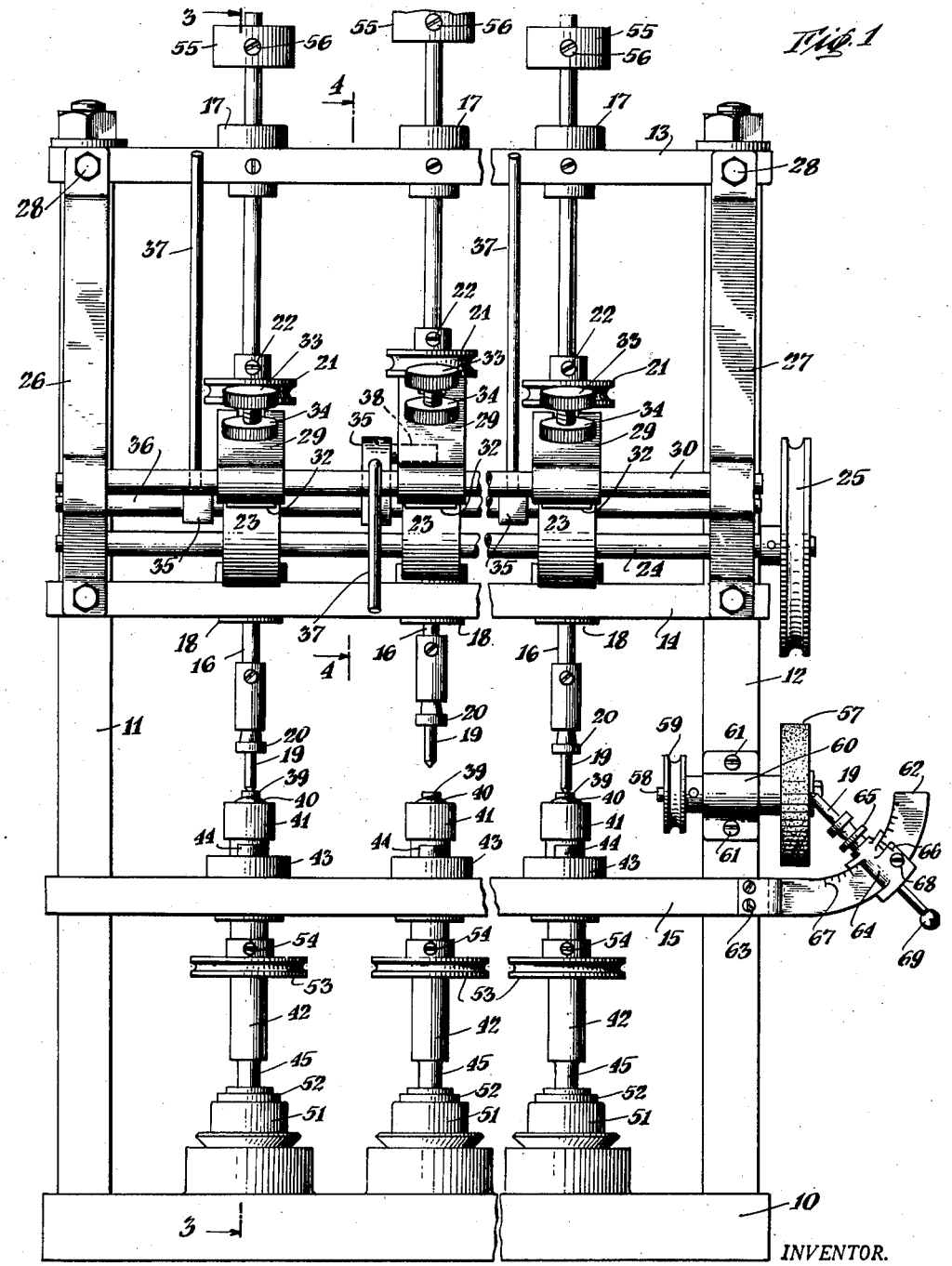
Fig. 1 is a front view of a machine embodying the invention.

In the drawings like reference characters denote like parts in the several views. In the following description and in the claims various details will be identified by specific names for convenience, but the names are intended to be as generic in their application as the art will permit.

The multiple spindle grinding machine shown in the drawings comprises a base 10 upon which there are mounted posts 11 and 12 carrying horizontal bars 13, 14 and 15 forming a framework or support for individual grinding units.

Each grinding unit consists chiefly of a tool carrying spindle, a chuck for the jewel to be ground and means for imparting various motions to the spindle and chuck.

In the illustrated example each spindle 16 is mounted for rotation about a vertical axis and for axial movement in suitable bearings 17 and 18, preferably of fibre, mounted in the horizontal bars 13 and 14 of the framework. Each spindle carries a grinding tool 19 preferably of steel or bronze at its lower end suitably mounted in a tool chuck 20 fitting into an internal taper 21a of the spindle 16.

The spindle is rotated at high speed preferably of the order of 3500 R. P. M. by means of a pulley 21 secured to the spindle by a pin 22. A periodic axial movement is imparted to each spindle by a suitable mechanism which in the illustrated example includes cams 23 on a common horizontal shaft 24 driven by a pulley 25. The shaft 24 is mounted in brackets 26 and 27 secured to the framework by screws 28. Levers 29 are pivoted on a rod 30 mounted in the brackets 26 and 27 and serve to transmit the cam movement to the spindles. For this purpose the free forked end of each lever 29 bears against a shoulder on the spindle 16, the pulley 21 serving as a shoulder in the illustrated example. The amplitude or stroke of the axial spindle movement is preferably made variable. For this purpose, cam engaging members 31 are secured to each lever 29 by a flat spring 32 (see also Fig. 4). The position of the cam engaging members 31 relatively to the levers 29 is adjustable by thumb screws 33 bearing against the flat springs 32 and carrying lock nuts 34 to hold the screws in any desired position.

Manually operable means may be provided for axially moving each spindle 16 out of control of the respective cam 23. For this purpose levers 35 are pivotally mounted on a rod 36 carried in the brackets 26 and 27. Each lever 35 has a handle 37 attached thereto and carries a pin 38 by means of which the spindle engaging lever 29 may be raised into a position out of control of the cam 23 as shown in solid lines in Figure 4. The pin 38 may be lowered into a position shown in dotted lines permitting the member 31 to rest on the cam and causing the spindle 16 to oscillate up and down for a purpose set forth hereinafter.

The jewel into which a V-shaped cavity is to be ground is held in a suitable work chuck which is preferably of the collet type. In the illustrated example, the jewel 39 is held in a collet 40 seated in the enlarged upper end or head 41 of a sleeve 42. The sleeve is mounted for rotation and for axial movement in a suitable bearing 43 which may be of fibre or bronze and which is secured to the horizontal bar 15 by screws 44. A draw bar 45 passes through the interior of the sleeve 42 and is screwed into the collet at 46. The draw bar 45 has a shoulder 47 against which a helical spring 48 is seated, the other end of the spring bearing against an internal shoulder 49 of the sleeve 42. The spring urges the collet into the head 41 causing the same to close automatically holding the jewel 39 firmly.

The lower end of the draw bar 45 rests against ball bearings 50. Cover members 51 and 52 on the base and the draw bar respectively may be provided to seal the bearings 50 against dust.

The sleeve 42 and the collet 40 therein are rotatable by means of a pulley 53 secured to the sleeve by a set screw 54. The direction of rotation of the collet chuck is preferably opposed to that of the tool spindle and may be of the order of 350 R. P. M., or about one-tenth of the spindle speed.

The floating mounting of the sleeve 42 in the bearing 43 permits of slight downward movement of the sleeve under manual pressure applied at the head 41 or at the pulley 53 against the action of the spring 48. This pressure causes the collet to open. If the pressure on the sleeve is released, the sleeve will move upwardly under action of the spring 48 causing the collet to close.

It will be noted that in the illustrated design the pressure exerted by the tool 19 is transmitted to the thrust bearing 50 by the draw bar 45 and does not act on the spring 48 which closes the collet chuck.

Means are provided for causing the tool 19 to bear against the workpiece, the jewel 39, with constant pressure, unaffected by a decrease in the length of the tool due to necessary repeated resharpening. For this purpose gravity means are employed which are in the illustrated example the weight of the tool spindle 16, of the tool and tool chuck 19 and 20 and of the spindle pulley 21. The pressure may be increased by an additional weight 55 attachable to the spindle by a set screw 56.

Means may be provided for sharpening and resharpening of the tools. For this purpose, there is shown a grinding wheel 57 mounted on a shaft 58. The shaft 58 carries a pulley 59 and runs in a bearing 60 attached to the post 12 by screws 61. A graduated segment 62 mounted to the post 12 at 63 carries an adjustable sleeve 64 for a holder 65 adapted to hold the tool chuck 20 of a tool to be resharpened. The holder 65 is freely slidable and rotatable in the sleeve 64. The sleeve carries an index mark 66 readable against the graduation 67 for setting the sleeve at the proper angle with respect to the face of the wheel 57 and has a set screw 68 for holding it in the adjusted position. The lower end 69 of the holder 65 may be ball-shaped for convenient handling.

The operation of the tool sharpening device is as follows: After insertion of a tool chuck 20 and tool 19 into the holder 65 set for the proper angle, the operator feeds the tool with slight pressure against the wheel, the ball-shaped end 69 of the holder 65 resting in the open palm of the operator's hand. The friction between the wheel and the point of the tool causes the tool and holder to rotate. The rotation is opposed by the friction exerted by the operator's hand on the ball-shaped end 69 of the holder 65. The rate of rotation may easily be controlled by the operator by increasing or decreasing the braking friction exerted by the operator's hand on the ball-shaped end 69 of the holder 65 to cause the tool to rotate slowly, whereby an accurate conical point is produced at the tip of the tool, the angle of the cone being equal to the angle of the V-cavity to be ground.

Means are provided for jointly driving the tool spindle 16 and the jewel chuck 40 on opposite directions at the proper speeds and for driving the cam 23 imparting an axial movement to the spindle. In the illustrated example, a common drive shaft 70 provided with a belt pulley 71 for connection to a prime mover or motor (not shown) carries pulleys 72 for driving the spindle pulleys 21 by belts 73, a pulley 74 for driving the cam pulley 25 by a belt 75 and a further pulley 76 for driving a pulley 77 on a second shaft 78 by a belt 79.

The second shaft 78 carries pulleys 80 for driving the chuck pulleys 53 by belts 81 and a large pulley 82 driving the wheel pulley 59 by a belt 83.

The operation of the jewel grinding machine is as follows:

A disc shaped jewel blank is inserted into the chuck 40 which opens by manual pressure on the head 41 or on the pulley 53 and closes automatically as hereinbefore described. A tool ground to the proper angle is inserted into the tool spindle and an abrasive consisting of diamond powder and a lubricant is applied to the point of the tool. The tool spindle is then lowered by moving the arm 37 into the position shown in dotted lines in Fig. 5 causing the point of the tool to rest on the jewel blank and producing a V-cavity of increasing depth.

During the grinding the cam 23 lifts the spindle 16 at intervals, preferably about once each second, causing the grinding tool to leave the cavity for short periods. The periodic separation of the tool and jewel permits the abrasive, which was forced out of the cavity during the preceding grinding, to flow back to the bottom of the cavity. At intervals the cavity and the point of the tool are re-examined and the tool resharpened, if it appears that the tip of the point has broken down.

The complete grinding of a V-cavity of one millimeter in diameter measured across the face of the jewel requires about 3½ minutes, assuming the jewel to be sapphire or ruby.

The individual tool spindles and chucks may easily be stopped by hand for insertion of blanks 39 or tools 19 or for inspection of the same without disturbing the remaining spindles. The belts driving the spindle and chuck pulleys 21 and 53 are preferably made of cord and slip if the spindle 16 or the chuck 40 is stopped by hand.

It will be apparent from the foregoing that the present invention provides a machine by means of which large numbers of V-cavities may be ground in jewels with utmost precision and uniformity never attainable by the conventional manual grinding methods.

A further feature of the invention is the automatic and mechanical production of a highly accurate and true V-cavity, the bottom of which is preferably smooth and the sides of which are accurately straight.

The grinding machine hereinbefore described is inexpensive to produce, easy to set up and adjust and simple to operate. The machine may be operated by unskilled workers and will produce results which are far superior to the best manual performance of highly skilled jewel workers.

While certain novel features of the invention have been disclosed herein, and are pointed out in the annexed claims, it will be understood that various omissions, substitutions and changes may be made by those skilled in the art without departing from the spirit of the invention.

What is claimed is:

1. A machine for grinding V jewels comprising in combination, a collet chuck for holding a jewel, the chuck being mounted for rotation about a substantially vertical axis; a rotatable shaft mounting said chuck, a thrust bearing upon which said shaft rests and rotates; a vertical tool spindle mounted for rotation coaxially with said chuck and for axial movement towards, and away from, said chuck; a shoulder on said tool spindle; gravity means for urging said spindle towards said chuck; a grinding tool carried by said spindle, said tool having a conical point corresponding in shape to the V-cavity to be ground; means including a cam and a rockable lever adapted to engage said cam and said shoulder for periodically moving said spindle away from said chuck against the action of said gravity means; means for jointly driving said chuck and spindle in opposite directions and for rotating said cam; a second lever having a member to engage said first lever, said second lever being manually operable to disengage said first lever out of control of said cam and to cause said first lever to move said spindle away from said chuck.

2. A machine for grinding V jewels comprising in combination, a chuck for holding a jewel, the chuck being mounted for rotation about a substantially vertical axis; a vertical tool spindle mounted for rotation coaxially with said chuck and for axial movement toward, and away from, said chuck; gravity means for urging said spindle towards said chuck; a grinding tool carried by said chuck, said tool having a conical point corresponding in shape to the V-cavity to be ground; a cam; a lever engaging said spindle for axially moving said spindle away from said chuck against the action of said gravity means; an adjustable cam engaging member on said lever, a screw for adjusting the position of said member relatively to said lever; means for jointly driving said chuck and said spindle in opposite directions and for rotating said cam; and manually operable means for axially moving said spindle away from said chuck and out of control of said lever.

3. A machine for grinding V jewels comprising in combination, a sleeve; a bearing mounting said sleeve for rotation about a substantially vertical axis and for axial movement; a collet in said sleeve; a draw bar screwed into said collet; a spring acting between said sleeve and draw bar in a direction to urge the collet into said sleeve thereby closing said collet; a thrust bearing for said draw bar; a vertical tool spindle mounted for rotation coaxially with said collet and draw bar and for axial movement towards, and away from, said collet; a grinding tool carried by said spindle, said tool having a conical point corresponding in shape to the V-cavity to be ground; means including a cam for periodically moving said spindle axially away from said collet; and means for jointly driving said sleeve and spindle in opposite directions and for rotating said cam.

4. A machine for grinding V jewels comprising in combination, a sleeve; a bearing mounting said sleeve for rotation about a substantially vertical axis and for axial movement; a collet in said sleeve; a draw bar screwed into said collet; a spring acting between said sleeve and draw bar in a direction to urge the collet into said sleeve thereby closing said collet; a thrust bearing for said draw bar; a vertical tool spindle mounted for rotation coaxially with said collet and draw bar and for axial movement towards, and away from, said collet; gravity means for urging said spindle towards said collet; a grinding tool carried by said spindle, said tool having a conical point corresponding in shape to the V-cavity to be ground; means including a cam for periodically moving said spindle away from said collet against the action of said gravity means; means for jointly driving said collet and spindle in opposite directions and for rotating said cam; and manually operable means for moving said spindle away from said chuck and out of control of said cam.

5. A machine for grinding V-jewels comprising in combination, a sleeve; a bearing mounting said sleeve for rotation about a substantially vertical axis and for axial movement; a collet in said sleeve; a draw bar screwed into said collet; a spring acting between said sleeve and draw bar in a direction to urge the collet into said sleeve thereby closing said collet; a thrust bearing for said draw bar; a vertical tool spindle mounted for rotation coaxially with said collet and draw bar and for axial movement towards, and away from, said collet; gravity means for urging said spindle towards said collet; a grinding tool carried by said spindle, said tool having a conical point corresponding in shape to the V-cavity to be ground; a cam; a lever engaging said spindle for axially moving said spindle away from said collet against the action of said gravity means; an adjustable cam engaging member on said lever; a screw for adjusting the position of said member relatively to said lever; means for jointly driving said collet and said spindle in opposite directions and for rotating said cam; and manually operable means for axially moving said spindle away from said collet and out of control of said lever.

6. A machine for grinding V jewels comprising in combination, a plurality of collet chucks for holding jewels to be ground, the chucks being mounted for rotation about substantially vertical axes; a plurality of vertical tool spindles, one for each chuck, mounted for rotation coaxially with the respective chucks and for axial movement toward, and away from, said chucks; gravity means for urging said spindles towards said chucks; a grinding tool carried by each spindle, the tool having a conical point corresponding in shape to the V-cavity to be ground; means including a shaft carrying a plurality of cams, one for each spindle, a plurality of levers engaging said spindles, one for each spindle for periodically moving the spindles away from the respective chucks against the action of said gravity means; an adjustable cam engaging member on each lever to adjust the position of each lever relatively to its respective cam; means for jointly driving said chucks and said spindles in opposite directions and for rotating said shaft; and individual manually operable means, one for each spindle, for lifting said levers and for moving said spindles away from their respective chucks and out of control of their respective cams.

MEYER KOULISH.